(12) United States Patent
Lai et al.

(10) Patent No.: US 10,268,842 B2
(45) Date of Patent: Apr. 23, 2019

(54) DEVICE FOR OPERATING A CAMERA IN A PRIVATE MODE AND A NON-PRIVATE MODE

(71) Applicant: MOTOROLA SOLUTIONS, INC, Chicago, IL (US)

(72) Inventors: Chee Heong Lai, Seremban (MY); Poh Huat Teoh, Gelugor (MY); Woo Kong Pang, Bayan Lepas (MY); Cherng Tar Khor, Ipoh (MY); Meng Tuck Chong, Bayan Lepas (MY); Yew Lih Yap, Sungai Ara (MY); Teik Heng Chong, Air Itam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/437,511

(22) Filed: Feb. 21, 2017

(65) Prior Publication Data
US 2018/0239930 A1    Aug. 23, 2018

(51) Int. Cl.
*H04N 1/21* (2006.01)
*G06F 16/58* (2019.01)
*G06F 21/53* (2013.01)
*G06F 21/62* (2013.01)
*G06F 21/74* (2013.01)
*H04N 5/232* (2006.01)

(52) U.S. Cl.
CPC .......... *G06F 21/74* (2013.01); *G06F 16/5866* (2019.01); *G06F 21/53* (2013.01); *G06F 21/62* (2013.01); *G06F 21/6245* (2013.01); *H04N 1/21* (2013.01); *H04N 5/23216* (2013.01); *H04N 5/23245* (2013.01); *G06F 2221/2105* (2013.01)

(58) Field of Classification Search
CPC .... G06F 21/74; G06F 17/30268; G06F 21/62; G06F 2221/2105; H04N 5/23293; H04N 5/23245; H04N 5/23216
See application file for complete search history.

(56) References Cited

U.S. PATENT DOCUMENTS

| | | | |
|---|---|---|---|
| 6,968,058 B1 * | 11/2005 | Kondoh | H04N 7/188 348/E7.056 |
| 7,710,486 B2 * | 5/2010 | Ito | H04N 1/32128 348/231.3 |
| 2013/0191910 A1 * | 7/2013 | Dellinger | G06F 3/0488 726/19 |

(Continued)

*Primary Examiner* — Gevell V Selby
(74) *Attorney, Agent, or Firm* — Raguraman Kumaresan (57) ABSTRACT

An electronic device to operate a camera in a private mode and non-private mode is provided. The electronic device includes a user interface (UI) including a first UI component and a second UI component, and an electronic processor coupled to the UI and the camera. The electronic processor controls the camera to be operated in a private mode in response to detecting an input selecting the first UI component, and a non-private mode in response to detecting an input selecting the second UI component. The electronic processor also tags the images captured in private mode as private images and non-private mode as non-private images. The electronic processor further applies different access policies for accessing the private and non-private images. Further, the first and second UI component are generated as graphical user interface components within a touch screen display of the electronic device.

13 Claims, 4 Drawing Sheets

(56) References Cited

U.S. PATENT DOCUMENTS

| | | | |
|---|---|---|---|
| 2014/0015987 A1* | 1/2014 | Harple | G06F 3/005 348/207.1 |
| 2015/0278206 A1* | 10/2015 | Lytell | G06F 17/3028 348/231.6 |
| 2016/0269376 A1* | 9/2016 | Goyal | H04L 63/0492 |

* cited by examiner

DEVICE FOR OPERATING A CAMERA IN A PRIVATE MODE AND A NON-PRIVATE MODE

BACKGROUND OF THE INVENTION

With the growing popularity and prevalence of electronic devices, and the incorporation of high quality camera functionality within the devices, new challenges for image processing and security have been introduced. Images captured by such cameras are typically stored in the camera memory or a media server. However, not all images stored in the camera memory or servers are intended by the user to be accessible for everyone. Several security mechanisms are available to secure the images that are private or confidential in nature. However, before any security mechanisms can be employed, users are required to manually review the images captured by the camera and categorize images that are private or confidential in nature. Further, not all users review the images after capturing them, whether immediately or in a future time period, and there is always a possibility of these images being intentionally or unintentionally copied or transmitted to unsecured mediums.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides an electronic device to operate a camera in a private mode and non-private mode. The electronic device includes a user interface (UI) including a first UI component and a second UI component, and an electronic processor coupled to the UI and the camera. The electronic processor controls the camera to be operated in a private mode in response to detecting an input selecting the first UI component, and a non-private mode in response to detecting an input selecting the second UI component.

Another exemplary embodiment provides an electronic device to operate a camera in a private mode and non-private mode. The electronic device includes a display having a touch screen display area and an electronic processor coupled with the display and the camera. The electronic processor generates a graphical user interface (GUI) including a first GUI component and a second GUI component within the touch screen display area, and controls the camera to be operated in a privacy mode in response to detecting a touch screen input selecting the first GUI component, and in a normal mode in response to detecting a touch screen input selecting the second GUI component.

A further exemplary embodiment provides an electronic device to operate a camera in a private mode and non-private mode. The electronic device includes a display having a touch screen display area, and an electronic processor coupled with the display and the camera. The electronic processor generates a graphical user interface (GUI) including a mode selection component and an image capture component. The mode selection component is configured to be selectable between a private mode and a non-private mode. The electronic processor controls the camera to be operated in the private mode in response to detecting an input selecting the private mode via the mode selection component and further detecting an input selecting the image capture component. The electronic processor controls the camera to be operated in the non-private mode in response to detecting an input selecting the non-private mode via the mode selection component and further detecting an input selecting the image capture component.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
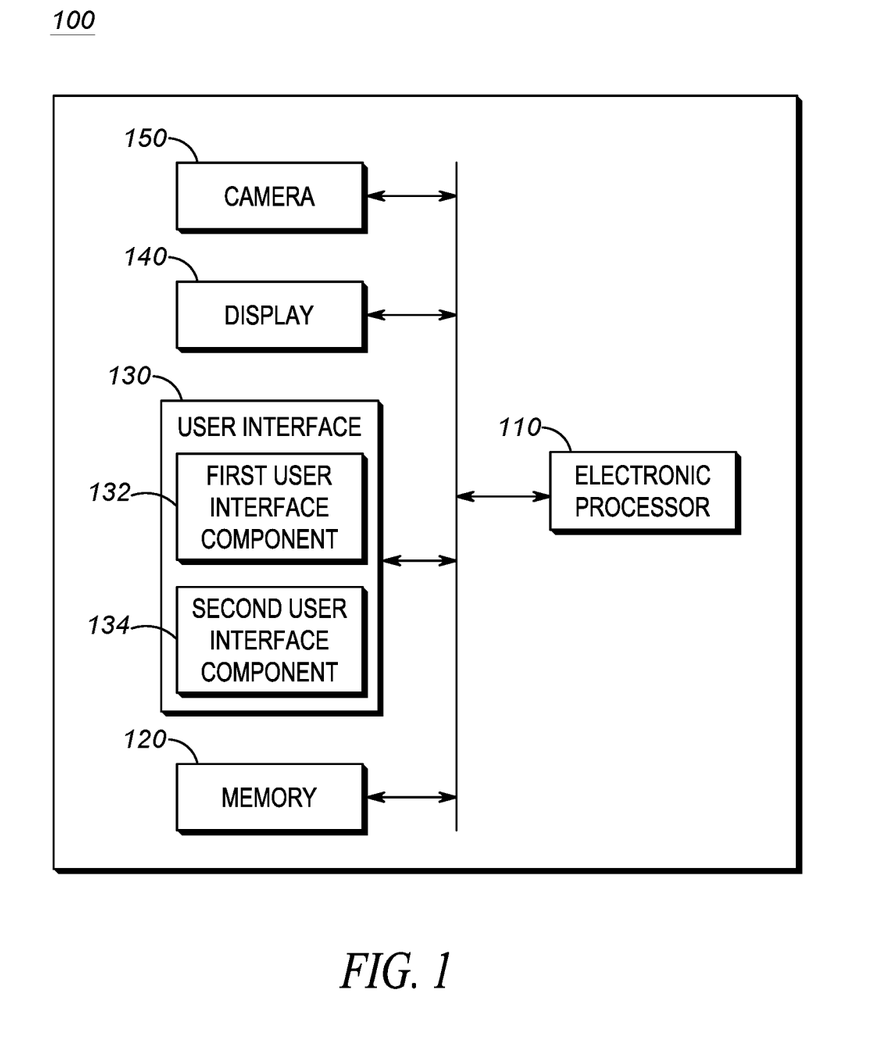
FIG. 1 is a block diagram of an electronic device, in accordance with some embodiments.

FIG. 1 is a block diagram of one exemplary embodiment of an electronic device 100. The electronic device 100 includes an electronic processor 110, memory 120, user interface 130 including a first user interface component 132 and a second user interface component 134, display 140, and camera 150. The illustrated components, along with other various modules and components are coupled to each other by or through one or more control or data buses that enable communication between the components of the electronic device 100. The use of control and data buses for the interconnection between and exchange of information among the various modules and components would be apparent to a person skilled in the art in view of the description provided herein. The electronic device 100 is presented as an example that may be programmed and configured to carry out the functions described herein. In some embodiments, the electronic device 100 may be a handheld device, a digital camera, or a wearable device that includes the components shown in FIG. 1. For example, the electronic device 100 may be a portable communication device, such as, for example a two-way radio including a digital camera, body-worn camera, a mobile device, laptop, or a tablet computer. In one embodiment, the electronic device 100 may include a dash camera in a vehicle coupled to a mobile two-way radio, a network-connected portable computer, or similar device in or coupled to the vehicle.

The electronic processor 110 obtains and provides information, for example, from the memory 120), and processes the information by executing one or more software instructions or modules, capable of being stored, for example, in a random access memory ("RAM") area of the memory 120 or a read only memory ("ROM") of the memory 120 or another non-transitory computer readable medium (not shown). The software can include firmware, one or more applications (e.g. camera application), program data, filters, rules, one or more program modules, and other executable instructions. The electronic processor 110 is configured to retrieve from the memory 120, and execute, among other things, software related to the control processes and methods described herein.

The memory 120 can include one or more non-transitory computer-readable media, and includes a program storage area and a data storage area. The program storage area and the data storage area can include combinations of different types of memory, as described herein.

Figure 2:
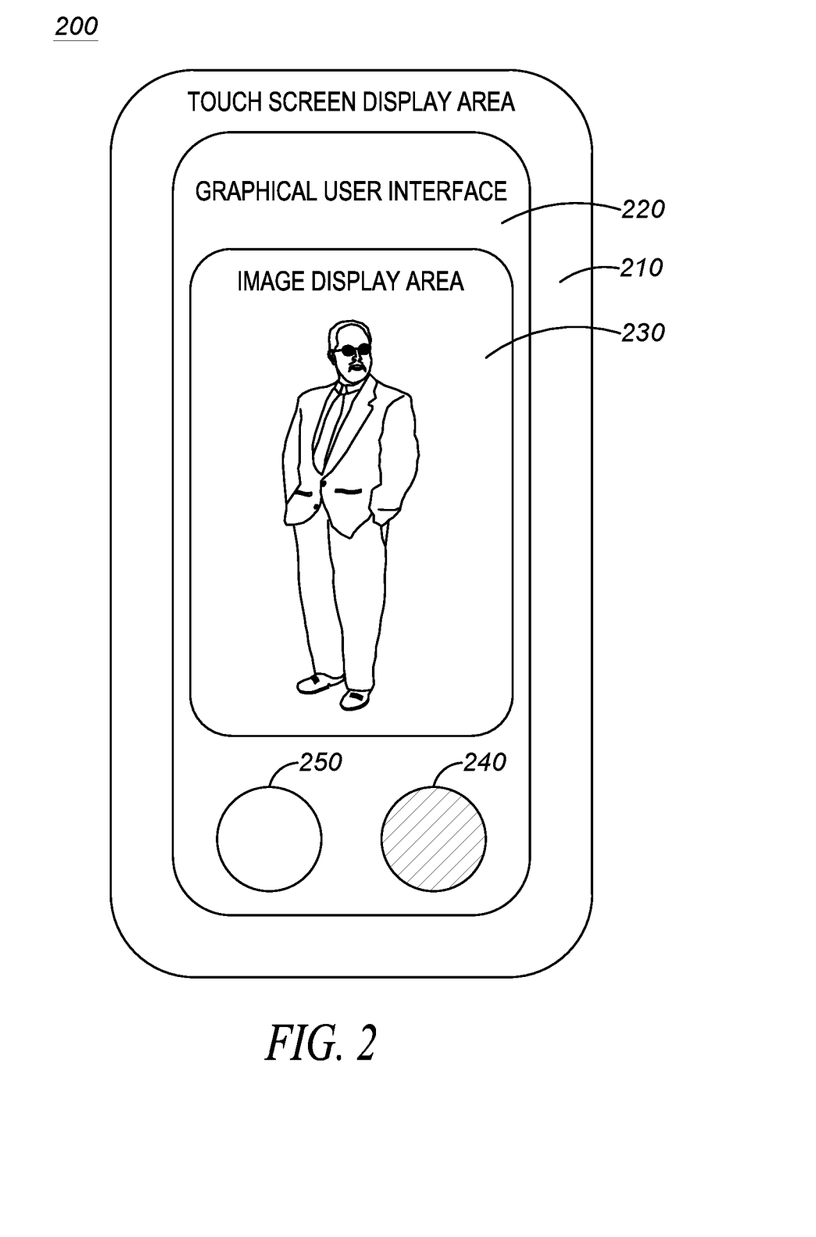
FIG. 2 illustrates an example of a touch screen display of the electronic device of FIG. 1, in accordance with some embodiments.

The user interface 130 operates to receive input from, for example, a user of the electronic device 100, to provide system output, or a combination of both. The user interface 130 obtains information and signals from, and provides information and signals to, devices both internal and external to the electronic device 100 (for example, over one or more wired and/or wireless connections). Input may be provided via, for example, a keypad, microphone, soft keys, icons, or soft buttons on the display 140, a scroll ball, buttons, and the like. The display 140 is a suitable display such as, for example, a liquid crystal display (LCD), or an organic light-emitting diode display (OLED) touch screen. An embodiment of the display 140 implemented as a touch screen display 200 is shown in FIG. 2. In this embodiment, as shown in FIG. 2, the touch screen display 200 includes a touch screen display area 210 that is configured to display an image or sequence of images captured by the camera 150. The electronic device 100 may implement a graphical user interface (GUI) 220 (for example, generated by the electronic processor 110, from instructions and data stored in the memory 120) presented within a touch screen display area 210 on the touch screen display 200 as shown in FIG. 2.

The camera 150 includes imaging components (such as an images sensor and optical components (e.g. lenses)) that are controlled by the electronic processor 110 to capture images by, for example, sensing light in at least the visible spectrum. It should be noted that the terms "image" and "images" as used herein, may refer to one or more digital images (of a target object) captured by the camera 150, or processed by the electronic processor 110, or displayed on the display 140. Further the terms "image" and "images" as used herein, may refer to still images or sequences of images such as a video. As shown in FIG. 2, the touch screen display 200 further includes an image display area 230 that displays one or more of the images captured by the camera 150, or obtained from the memory 120, or received from a remote media device or server. In one embodiment, the image display area 230 also serves as a view finder that allows the user to see the field of view of the camera 150. In addition, the GUI 220 may include additional interface components that allow the user to control or adjust one or more camera parameters, for example, lighting conditions, timer, exposure, resolution, color effects, flash control, and the like.

In some embodiments, separate UI components are provided in the electronic device 100 to allow a user to input selection of a private mode or non-private mode for the operation of the camera 150. In accordance with some embodiments the mode selection is input by the user via an actuation or interaction (for example, "click" or "touch" or "press/tap" or "press and hold" or "slide") of the UI components and further prior to the image being captured and processed. In some embodiments, the user does not need to provide additional instructions or input to the device 100 to indicate whether a captured image needs to be tagged as a private image or non-private image. In these embodiments, the electronic processor 110 automatically controls the camera 150 to capture the image and process the image depending on whether the camera 150 is operated in a private mode or non-private mode based on the user selection of the first UI component 132 or second UI component 134.

In one embodiment, as shown in FIG. 2, the first UI component 132 and second UI component 150 are implemented as GUI components (i.e. private mode button 240 and non-private mode button 250, respectively) that are generated and displayed within a touch screen display area 210 of the touch screen display 200. In one implementation of this embodiment, the private mode button 240 and non-private mode button 250 are separated by a distance within the touch screen display area 210, such that a touch input area corresponding to the private mode button 240 does not overlap with a touch input area corresponding to the non-private mode button 250. In another embodiment, the private mode button 240 and non-private mode button 250 are implemented as physical components (for example, physical buttons or soft keys) that are disposed in an housing of the electronic device 100 and further may be separated by a distance within an housing of the electronic device 100. The separation ensures that an input area corresponding to the private mode button 240 does not overlap with an input area corresponding to the non-private mode button 250. In these embodiments, the separation of UI components improves ease of access by the users in selecting the private mode or non-private mode for the operation of the camera 150. In one implementation, the private mode button 240 and non-private mode button 250 are represented in different colors or textures to provide distinction and ease of recognition for the mode selection.

In accordance with embodiments, the electronic processor 110 is configured to detect a user input selecting a first UI component 132 or a second UI component 34. If a user input selecting the first UI component 132 is detected (for example, in response to detecting a touch input on the private mode button 240), the electronic processor 110 automatically controls the camera 150 to be operated in a private mode. Alternatively, if a user input selecting the second UI component 134 (for example, in response to detecting a touch input on the non-private mode button 250) is detected, the electronic processor 110 automatically controls the camera 150 to be operated in a non-private mode. In private mode, the electronic processor 110 controls the camera 150 to capture an image and automatically tag the image as a private image and further perform encryption of the captured images without any additional user input. In contrast, in non-private mode, the electronic processor 110 controls the camera 150 to capture an image and automatically tag the image as a non-private image and in some embodiments, without performing any encryption to the captured images. Further, the electronic processor 110 also automatically applies different access policies or rules to images captured during private mode and non-private mode. For example, the electronic processor 110 applies a first access policy to images captured during the private mode and applies a second access policy to images captured during the non-private mode.

In one embodiment, the application of the first access policy causes the images captured during the private mode to be stored in a private folder (also referred herein as a first memory portion and may be encrypted) within the memory 120 or in a remote media server or device, wherein the private folders requires a key input (such as a previously set password or a pass code) in order for the user to access the private image stored in the private folder. In this case, the first access policy may automatically associate the set password to all images stored in the private folder. In another implementation, the first access policy may be applied to request user to set password or pass code for accessing an image (or a set of images) captured by the camera 150 in a private mode each time an image capturing session is initiated (or alternatively when the session is terminated). In this embodiment, the electronic processor 110 may automatically create a sub-folder within the private folder for storing images captured during a particular private mode session. The images captured in each session are further stored in separate sub-folders and the first access policy may require different key input for accessing images captured during different private mode sessions and stored in separate sub-folders. An indication of the initiation of the image capturing session may be received by the electronic processor 110 when a camera application is executed by the user and similarly an indication of the termination of the image capturing session is received when a camera application is terminated by the user. In another embodiment, the first access policy may be configured to allow pre-specified users (for example, devices of family members) to access the image without the key input.

The application of the second access policy causes the images captured during the non-private mode to be stored in a non-private folder (also referred herein as a second memory portion) within the memory 120 or in a remote media device or server, wherein the non-private folder may not require the key input, unless the user overrides the application settings provided by the second access policy and sets a key (which requires an additional input from the user) for accessing an image stored in the non-private folder.

In one embodiment, the electronic processor 110 allows the user to preview the images captured during a private mode (i.e. response to detecting an input selecting first UI component 132 or private mode button 240) while not requiring any key input from the user for a short duration of the time after capturing the image or after the session is terminated. For example, in this embodiment, the electronic processor 110 is configured to apply the first access policy to the images captured during a private mode session only after a predetermined period (as set by the user) from an input unselecting the first UI component 132 (for example, in response to the detecting a release of the private mode button 240), and further the electronic processor 110 is configured to apply the second access policy (which does not require key input) during a predefined time period. In another implementation, the electronic processor 110 is configured to apply the second access policy to the images captured during a particular private mode session for the time period of the same session (i.e. to support preview of images without requirement of key input). After the session is terminated, the first access policy is automatically applied to the images captured during the terminated private mode session. In other words, the user will not be able to preview (i.e. access) the images captured during previous sessions (i.e. after the predefined time period from unselecting the first UI component 132) without the key input.

In some embodiments, the electronic device 100 may also include components not shown in FIG. 1 to carry out additional functions. For example, the electronic device 100 may include a communication interface (now shown) to enable the device 100 to communicate with other devices or cloud servers via wired or wireless connections. In one embodiment, the image captured by the camera 150 may be uploaded to a server or forwarded to another device. In this embodiment, the first access policy or second access policy is automatically applied to the images that are captured and uploaded to a server as described above in response to selecting a first UI component 132 or second UI component 134. For example, the user can input private mode selection with a single input (for example, a single touch input of the private mode button 240) to operate the camera 150 in private mode. The operation of camera 150 in private mode includes capturing images, tagging the images as private images, applying first access policy requiring key input, performing encryption, and also automatically uploading or transmitting images to another indicated device or server. Similarly, the user can input non-private mode selection with a single touch input to operate the camera in non-private mode that includes capturing images, tagging the images as non-private mode, applying second access policy that does not require key input and also automatically uploading or transmitting to another indicated device or server. In these cases, the electronic device 110 also transmits the access policy to be applicable at the server depending on whether the image uploaded to the server was captured in private or non-private mode.

Figure 3:
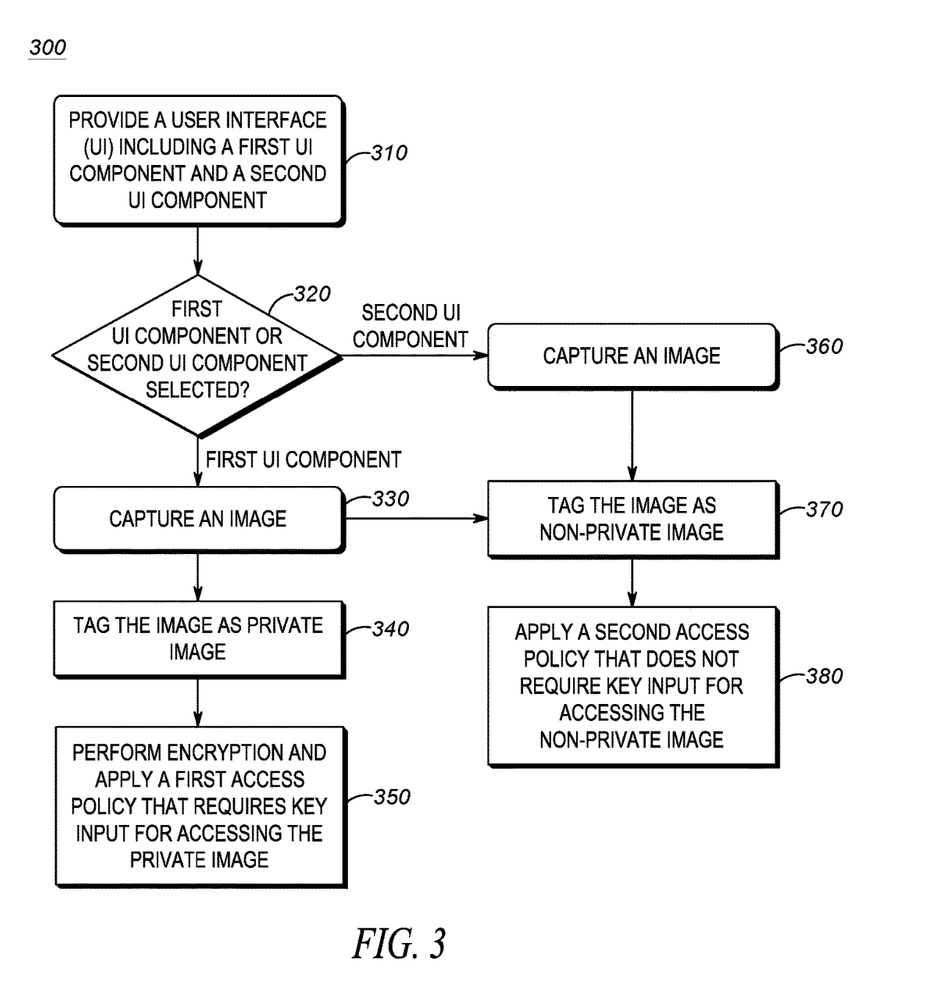
FIG. 3 is a flowchart of a method for operating a camera in a private mode and a non-private mode, in accordance with some embodiments.

FIG. 3 is a flowchart of an exemplary method 300 of operating a camera 150 in a plurality of modes. As an example, the method 300 is performed by the electronic processor 110 of the electronic device 100. Other embodiments of the method 300 may be performed on multiple processors within the same device or on multiple devices.

At block 310, the electronic processor 110 provides a user interface 130 that includes the first UI component 132 and second UI component 134. As shown in FIG. 2, the electronic processor 110 generates a private mode button 240 and a non-private mode button 250 within the touch screen display area 210 of the touch screen display 200. Next, at block 320, the electronic processor 110 detects if any input selecting first UI component 132 or second UI component 134 is received. When the first UI component 132 is selected at block 320, the electronic processor 110 initiates the operation of the camera 150 in private mode by capturing the image (or sequence of images) at block 330 and tagging the image as private image at block 340. In one embodiment, the electronic processor 110 tags the image as private image by adding the tag information in the metadata of the stored image. The tagging of image by the device 100 as a private image in response to the user selection of the first UI component 132 includes categorization of images and storage of images captured in private mode in a separate portion (i.e. first memory portion) of the memory 120. Next, at block 350, the electronic processor 110 performs encryption of the image or images captured in response to the selection of the first UI component 132, and further apply a first access policy that requires key input for accessing the private image as described above with reference to FIG. 1 and FIG. 2.

Returning to block 320, when the second UI component 134 is selected, the electronic processor 110 initiates the operation of the camera 150 in non-private mode by capturing the image at block 360 and tagging the image as a non-private image at block 370. In one embodiment, the electronic processor 110 tags the image as non-private image by adding the tag information in the metadata of the stored image. The tagging of the image by the device 100 as a non-private image in response to user selection of the second UI component 134 includes automatic categorization of images and storage of images captured in non-private mode in a separate portion (i.e. second memory portion) of the memory 120. This allows the user to easily organize the images captured in private mode and non-private mode without any additional input other than selecting or actuating the first UI component 132 or second UI component 134. Next, at block 380, the electronic processor 110 applies a second access policy as described above with reference to FIG. 1 and FIG. 2, where the second access policy does not require key input for images captured in private mode.

Figure 4:
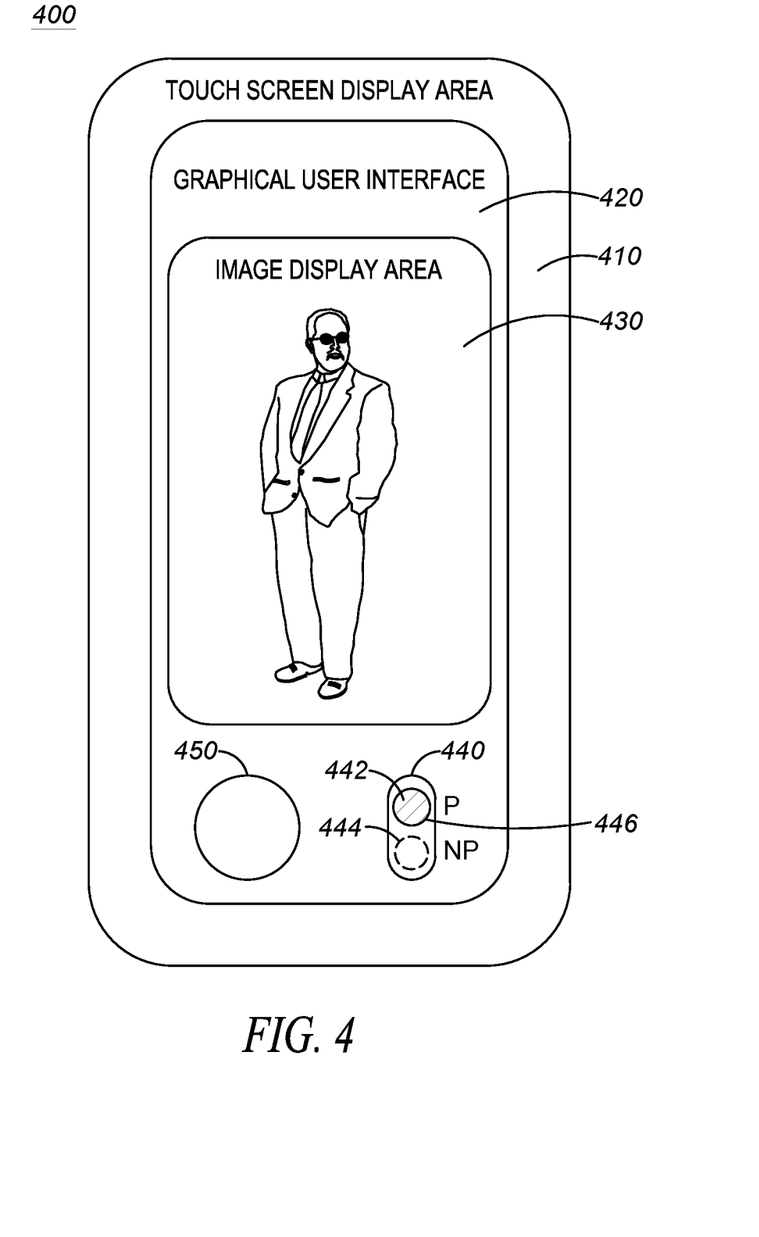
FIG. 4 illustrates another example of a touch screen display of the electronic device of FIG. 1, in accordance with some embodiments.

Referring to FIG. 4, an embodiment of the display 140 implemented as a touch screen display 400 is shown. The touch screen display 400 includes a touch screen display area 410 having a GUI 420 and image display area 430. The touch screen display area 410, GUI 420, and image display area 430 are similar to the touch screen display area 210, GUI 220, and image display area 230, respectively as shown in FIG. 2. The touch screen display 400 further includes a mode selection component 440 and image capture component 450 within the GUI 420. The mode selection component 440 allows the user to select between a private mode and a non-private mode for the operation of the camera 150. In one embodiment, the mode selection component 440 includes a mode selection area (private mode selection area 'P' 442 and non-private mode selection area 'NP' 444) and a toggle button 446 that is configured to be slidable to a first (i.e. private mode selection area 442) or second portion (i.e. non-private mode selection area 444) of the mode selection area to allow the user to select between the private mode and non-private mode for the operation of the camera 150. For example, the user can slide the toggle button 446 from a bottom portion (non-private mode selection area 444) to the top portion (private mode selection area 442) of the mode selection area to switch to the private mode and slide the toggle button 446 from the top portion (private mode selection area 442) to the bottom portion (non-private mode selection area 444) of the mode selection area to switch to a non-private mode. Depending on the selection of the private mode or non-private mode via the mode selection component 440, the electronic processor 110 operates the camera either in a private mode or non-private mode in response to the selection of the image capture component 450 (for example, in response to detecting a touch input selecting the image capture component 450). In this embodiment, the operation of the camera 150 either in private mode or non-private mode including the application of the access policy is similar to the embodiments described above with reference to FIGS. 1-3.

In another implementation of this embodiment (not shown), the image capture component 450 can be eliminated by implementing its functionality within the mode selection component 440. For example, the toggle button 446 of the mode selection component 440 may further include a functionality that allows the toggle button 446 to be further pressed (after sliding to select the private mode or non-private mode) to capture the image in private mode or non-private mode. In this implementation, the slide input is used for selecting between the private mode and non-private mode and the press input is used for capturing the image in a private mode or non-private mode depending on the mode selected by the slide input.

In accordance with embodiments of the disclosure, the device and method described herein can be advantageously employed to simplify the categorization and processing of photos and videos that are considered as private or confidential in nature due to its content (e.g. private photos, identification and transaction cards, salary statements, bank statements, confidential notes etc. captured by camera for personal or private use). For example, the implementation of the embodiments of this disclosure allows the user to operate the camera in a private mode or non-private mode with a single user input or action (for example, by selecting or actuating either a private mode button or non-private mode button) and further perform additional processing (tagging, encryption, storing/transmitting, applying access policy etc.) on the images depending on the mode selection and without any additional user input or actions. This implementation allows the user to automatically separate the private photos, images, and documents captured by the camera and further protect them with security privileges. Further, the separation of the UI components, one each for selection of private mode and non-private mode simplifies user operation as each button serves one purpose and further reduces confusion or errors with regard to the selection of the modes. The separation of the UI components described in this disclosure can also be advantageously implemented in programs (e.g. bring your own device programs), where organizations allow the user to use single device for both personal and business use. In this case, the user can select the non-private button to capture personal photos, notes, and documents, and private button to capture photos, notes, documents that are for business use.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately,"

"about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device comprising:
a camera;
a user interface (UI) comprising a first UI component and a separate second UI component; and
an electronic processor coupled to the UI and the camera, wherein the electronic processor is configured to
detect an input selecting the first UI component, and responsive to detecting the input selecting the first UI component, (i) control the camera to capture an image and (ii) process the captured image in a private mode by tagging the image as a private image,
detect an input selecting the second UI component, and responsive to detecting the input selecting the second UI component, (i) control the camera to capture an image and (ii) process the captured image in a non-private mode by tagging the image as a non-private image;
apply a first access policy to the private image and a second access policy to the non-private image, wherein the first access policy requires a key input for accessing the private image and the second access policy does not require the key input for accessing the non-private image; and
apply the first access policy to the private image after a predefined time period from an input unselecting the first UI component and apply the second access policy to the private image during the predefined time period.

2. The electronic device of claim 1, wherein the electronic processor is configured to perform encryption for the private image.

3. The electronic device of claim 1, wherein the first access policy is applied to the private image transmitted to at least one other device and the second access policy is applied to the non-private image transmitted to the at least one other device.

4. The electronic device of claim 1, further comprising a memory including a first memory portion and a second memory portion, wherein the electronic processor controls the camera to store the private image in the first memory portion and the non-private image in the second memory portion.

5. The electronic device of claim 1, wherein the user interface comprises a touch screen display having a display area, and further wherein the electronic processor is configured to generate a graphical user interface (GUI) including the first UI component and second UI component within the display area.

6. The electronic device of claim 5, wherein the electronic processor is configured to detect an input selecting the first UI component or the second UI component based on a respective touch input received corresponding to the first UI component or the second UI component.

7. The electronic device of claim 5, wherein the first UI component and second UI component are separated by a distance within the display area, such that an input area corresponding to the first UI component does not overlap with an input area corresponding to the second UI component.

8. The electronic device of claim 1, wherein the first UI component and second UI component are physical buttons.

9. An electronic device comprising:
a camera;
a display having a touch screen display area; and
an electronic processor coupled with the display and the camera, wherein the electronic processor is configured to
generate a graphical user interface (GUI) including a first GUI component and a separate second GUI component within the touch screen display area,
detect a touch input selecting the first GUI component, and responsive to detecting the touch input selecting the first GUI component, (i) control the camera to capture an image and (ii) process the captured image in a private mode by tagging the image as a private image, detect a touch input selecting the second GUI component, and responsive to detecting the touch input selecting the second GUI component, (i) control the camera to capture an image and (ii) process the captured image in a non-private mode by tagging the image as a non-private image;

enforce a first access policy to the private image and a second access policy to the non-private image, wherein the first access policy requires a key input for accessing the private image and the second access policy does not require the key input for accessing the non-private image; and apply the first access policy to the private image after a predefined time period from an input unselecting the first GUI component, and further wherein the electronic processor is configured to apply the second access policy to the private image during the predefined time period.

10. The electronic device of claim 9, wherein the electronic processor is configured to perform encryption for the private image.

11. The electronic device of claim 9, wherein the first access policy is applied to the private image transmitted to at least one other device and the second access policy is applied to the non-private image transmitted to the at least one other device.

12. The electronic device of claim 9, wherein the first GUI component and second GUI component are separated by a distance within the touch screen display area, and further wherein the first GUI component and second GUI component are represented in different colors or textures.

13. An electronic device, comprising:

a camera;

a user interface (UI) comprising a first UI component and a separate second UI component; and an electronic processor coupled to the UI and the camera, wherein the electronic processor is configured to detect an input selecting the first UI component, and responsive to detecting the input selecting the first UI component, (i) control the camera to capture an image and (ii) process the captured image in a private mode, detect an input selecting the second UI component, and responsive to detecting the input selecting the second UI component, (i) control the camera to capture an image and (ii) process the captured image in a non-private mode;

wherein the first UI component and second UI component are physical buttons that are separated by a distance within a housing of the electronic device, and further wherein the first UI component and second UI component are represented in different colors or textures.

* * * * *